(12) United States Patent
Van Den Elzen

(10) Patent No.: US 8,773,316 B2
(45) Date of Patent: Jul. 8, 2014

(54) DOCKING STATION APPARATUS

(75) Inventor: Jan Johannes Maria Van Den Elzen, Gemert (NL)

(73) Assignee: TomTom International B.V., Amsterdam (NL)

( * ) Notice: Subject to any disclaimer, the term of this patent is extended or adjusted under 35 U.S.C. 154(b) by 346 days.

(21) Appl. No.: 13/127,243

(22) PCT Filed: Nov. 3, 2009

(86) PCT No.: PCT/EP2009/064508
§ 371 (c)(1),
(2), (4) Date: May 10, 2011

(87) PCT Pub. No.: WO2010/052204
PCT Pub. Date: May 14, 2010

(65) Prior Publication Data
US 2011/0216500 A1 Sep. 8, 2011

(30) Foreign Application Priority Data

Nov. 5, 2008 (GB) .................................. 0820241.8
Nov. 5, 2008 (GB) .................................. 0820242.6

(51) Int. Cl.
*H01Q 1/00* (2006.01)
(52) U.S. Cl.
USPC ........................................ 343/720

(58) Field of Classification Search
USPC ........... 343/720, 745, 702; 701/472, 468, 500
See application file for complete search history.

(56) References Cited

U.S. PATENT DOCUMENTS

| | | | | |
|---|---|---|---|---|
| 5,982,253 A | * | 11/1999 | Perrin et al. | 333/182 |
| 6,980,163 B2 | * | 12/2005 | Terreault et al. | 343/703 |
| 7,899,425 B2 | * | 3/2011 | Forster | 455/269 |
| 2004/0070548 A1 | | 4/2004 | Cake | |
| 2004/0196187 A1 | * | 10/2004 | Yeh | 343/700 MS |
| 2008/0027644 A1 | * | 1/2008 | Spencer et al. | 701/213 |

FOREIGN PATENT DOCUMENTS

| DE | 202007010033 U1 | 11/2007 |
|---|---|---|
| GB | 2412254 A | 9/2005 |

OTHER PUBLICATIONS

PCT/EP2009/064508, ISR (International Search Report) dated Mar. 4, 2010.

* cited by examiner

*Primary Examiner* — Thien M Le

(57) ABSTRACT

A docking station apparatus (140) comprises a holder portion (143) for removably receiving a navigation apparatus (100). A base portion (141) coupled to the holder portion (143) comprises an RDS antenna apparatus (188), the RDS antenna apparatus (188) comprising a pole portion (170, 172) extending so as to form a loop, line or track. The RDS antenna apparatus (188) is located opposite the holder portion (143).

13 Claims, 6 Drawing Sheets

DOCKING STATION APPARATUS

This application is the National Stage of International Application No. PCT/EP2009/064508, filed Nov. 3, 2009 and designating the United States. This application claims priority from UK applications GB0820241.8 and GB0820242.6, both filed Nov. 5, 2008. The entire content of these applications is incorporated herein by reference.

FIELD OF THE INVENTION

The present invention relates to a docking station apparatus of the type that, for example, comprises a holder portion coupled to a base portion for affixing to a surface, for example a windscreen

BACKGROUND TO THE INVENTION

Portable computing devices, for example Portable Navigation Devices (PNDs), which include GPS (Global Positioning System) signal reception and processing functionality are well known and are widely employed as in-car or other vehicle navigation systems.

In general terms, a modern PND comprises a processor, memory, and map data stored within said memory. The processor and memory cooperate to provide an execution environment in which a software operating system can be established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include: a visual display and a speaker for audible output. Illustrative examples of input interfaces include: one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device through the display.

PNDs of this type also include a GPS antenna by means of which satellite-broadcast signals, including location-related data, can be received and subsequently processed to determine a current location of the device.

PNDs of this type can be mounted on the dashboard or windscreen of a vehicle, but can also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

In the context of a PND, once a route has been calculated, the user interacts with the navigation device to select the desired calculated route, optionally from a list of proposed routes. Optionally, the user can intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

Whilst it is known for the device to perform route re-calculation in the event that a user deviates from the previously calculated route during navigation (either by accident or intentionally), a further important function provided by the device is automatic route re-calculation in the event that real-time traffic conditions dictate that an alternative route would be more expedient. The device is suitably enabled to recognize such conditions automatically, or if a user actively causes the device to perform route re-calculation for any reason.

In this respect, the device can continually monitor road and traffic conditions, and offer to or choose to change the route over which the remainder of the journey is to be made due to changed conditions associated with the initially selected route. Real time traffic monitoring systems, based on various technologies (e.g. mobile phone data exchanges, fixed cameras, GPS fleet tracking) are being used to identify traffic delays and to feed the information into notification systems, for example a Radio Data System (RDS)—Traffic Message Channel (TMC) service.

Hence, traffic-related information is of particular use when calculating routes and directing a user to a location. In this respect, and as suggested above, it is known to broadcast traffic-related information using the RDS-TMC service supported by some broadcasters. In the UK, for example, one known traffic-related information service is broadcast using the frequencies allocated to the station known as "Classic fm". The skilled person should, of course, appreciate that different frequencies are used by different traffic-related information service providers.

A PND, provided with an RDS-TMC receiver for receiving an RDS data broadcast, can decode the RDS data broadcast and extract TMC data included in the RDS data broadcast. Such Frequency Modulation (FM) receivers need to be sensitive. For many PNDs currently sold, an accessory is provided comprising an RDS-TMC tuner coupled to an antenna at one end thereof and a connector at another end thereof for coupling the RDS-TMC receiver thereof to an input of the PND.

Devices of the type described above, for example the 920 GO model manufactured and supplied by TomTom International B.V., which support use of the above-described antenna, support a process of enabling users to navigate from one location to another, in particular using traffic-related information. Such devices are of great utility when the user is not familiar with the route to the destination to which they are navigating.

However, the effectiveness of such devices can sometimes depend upon the effectiveness of the antenna and/or any associated circuitry employed. In this respect, in the field of antenna design, a number of antenna structures are known to have varying degrees of suitability in relation to receipt of RDS-TMC data. One antenna structure is a so-called dipole antenna structure, having numerous variants thereof, for example a symmetric dipole antenna structure and an asymmetric dipole antenna structure. Wired variants of the symmetric and asymmetric dipole antenna structures comprise a pair of wires, for example flexible wires, constituting a first pole and a second pole. The symmetric antenna structure was originally designed for symmetric Radio-Frequency (RF) input circuits, the symmetric antenna structure simply comprising symmetric twin cables that were connected to an RF receiver. An RF transformer was provided in the RF receiver in order to convert a symmetric antenna signal to an asymmetric antenna signal that could be amplified by a suitable RF amplifier circuit in the RF receiver. Over time, as this technology was developed, a so-called "feedline" was introduced into the design of the antenna for high frequency and/or weak signal applications in order to distance the antenna poles from "noisy" electrical circuitry to which the antenna structure was to be coupled. One type of feedline employed was in the form of a length of coaxial cable. However, the coaxial cable is a transmission line having conductors of unequal impedances with respect to ground potential and so is considered "unbalanced". In order to match the symmetric impedances (balanced) of the pole wires with the asymmetric impedances of the feedline, it is known to place a so-called "balun" in-line between the pole wires and the feedline, thereby matching the impedances of the pole wires and the feedline and so mitigating unwanted common-mode currents from flowing in the feedline that can cause the pole wires to radiate RF energy.

The so-called dipole antenna structure mentioned above can be employed with varying results in terms of antenna sensitivity. In one further known implementation of the dipole antenna, the wires constituting the first and second poles are arranged so as to extend away from each other in order to provide effective performance.

However, it is desirable to avoid use of the relatively long wires as poles, because the user is burdened with the task of extending and arranging a pair of wires, which can be cumbersome for a user to deploy in a vehicle in order to obtain acceptable levels of antenna sensitivity. Additionally, whilst the level of sensitivity of the above-described antennas is acceptable, it is still nevertheless desirable to increase the sensitivity of the antenna.

One solution to overcome this problem is to dispose the antenna poles in a housing of a mount or docking station or similar accessory for the PND.

In this context, the antenna can be formed with a first solid planar pole and a second solid planar pole. However, when the PND is docked, the antenna located within the housing of the docking station is disposed opposite the PND and in relatively close proximity thereto.

As mentioned above, the PND comprises the GPS antenna to receive satellite broadcast signals relating to GPS data. Typically, the GPS antenna is located within the housing of the PND. Unfortunately, the location of the antenna for receipt of the RDS-TMC data, when formed in the various manners described above, hinders the performance of the GPS antenna due to the proximity of the RDS-TMC antenna located in the docking station or mount to the internal GPS antenna of the PND, thereby hindering receipt of ephemeris data via the GPS antenna.

SUMMARY OF THE INVENTION

According to a first aspect of the present invention, there is provided a docking station apparatus comprising: a holder portion for removably receiving a navigation apparatus; and a base portion coupled to the holder portion and comprising an RDS antenna apparatus, the RDS antenna apparatus comprising a pole portion extending so as to form a loop, line or track; wherein the RDS antenna apparatus is located opposite the holder portion.

The navigation apparatus may comprise an antenna associated with receipt of information for location determination; the antenna may be located substantially opposite the RDS antenna apparatus when the navigation apparatus is being held by the holder portion.

The RDS antenna apparatus may be disposed on a carrier.

The RDS antenna apparatus may further comprise a second pole portion

The second pole portion may also extend so as to form another loop, line or track.

The second pole portion may be disposed on the carrier or another carrier.

The first pole portion may be crescent-shaped. The second pole portion may be crescent-shaped.

The first pole portion may be disposed adjacent the second pole portion so as substantially to define a disc shape.

The carrier and/or the another carrier may be one or more circuit boards.

The RDS antenna apparatus may be a dipole antenna apparatus.

An antenna element forming the loop, line or track may be between about 35 µm thick and about 1.5 mm thick, for example between about 0.5 mm thick and about 1.5 mm thick.

The RDS antenna apparatus may be located opposite the antenna associated with receipt of information for location determination; the RDS antenna apparatus may be spaced from the antenna.

The base portion may comprise a cavity for housing the RDS antenna; the cavity of the base portion may be spaced from the holder portion.

The antenna associated with receipt of information for location determination may be a global navigation satellite system signal reception antenna.

The pole portion may be capacitive.

It is thus possible to provide an antenna apparatus capable of providing improved antenna sensitivity, for example an increase in sensitivity of a factor of three as compared to the dipole antenna lacking the pole extension portion. Furthermore, the dipole antenna is sufficiently small to be neatly located within a mount or docking station apparatus, whilst at least maintaining performance in relation to receipt of RF signals, particularly those broadcast at frequencies used to bear TMC data. Additionally, the user is not burdened with the extension and arrangement within a vehicle of a pair of relatively long pole wires. Improved flexibility in respect of mounting a docking station is thus achieved. Furthermore, the antenna apparatus does not impede performance of a satellite broadcast receipt antenna, for example a GPS antenna, located opposite and in proximity to the antenna apparatus. The improved performance provided by the apparatus also reduces instances of user annoyance and false enquires made to manufacturers, distributors and/or retailers concerning whether or not the apparatus is faulty.

Advantage of theses embodiments are set out hereafter, and further details and features of each of these embodiments are defined in the accompanying dependent claims and elsewhere in the following detailed description.

BRIEF DESCRIPTION OF DRAWINGS

At least one embodiment of the invention will now be described, by way of example only, with reference to the accompanying drawings, in which.

DETAILED DESCRIPTION OF PREFERRED EMBODIMENTS

Figure 1:
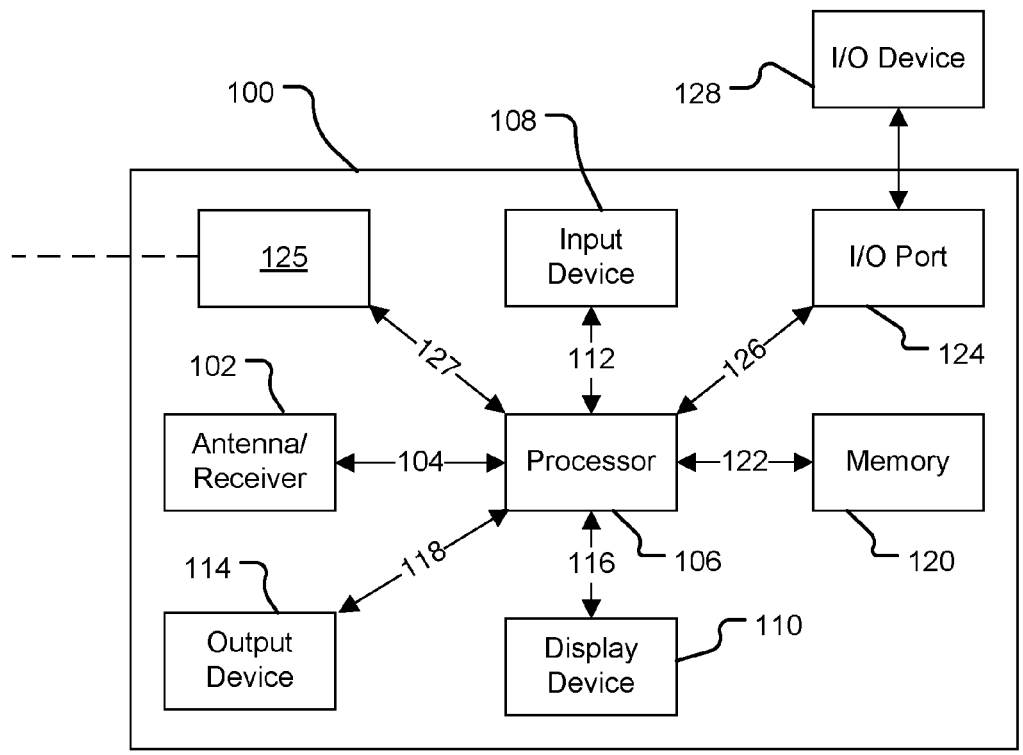
FIG. 1 is a schematic diagram of components of a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device. In this respect, the processing device need not be configured to execute navigation software in a portable or mobile manner so as to provide route planning and navigation functionality. In the context of the navigation-related examples described herein, however, it should be appreciated that a navigation device is intended to include (without limitation) any type of route planning and navigation device, irrespective of whether the navigation device is embodied as a PND, a vehicle such as an automobile, or indeed a portable computing resource, for example a portable personal computer (PC), a mobile telephone or a Personal Digital Assistant (PDA) executing route planning and navigation software.

As suggested above, it will also be apparent from the following that the teachings herein even have utility in circumstances where a user is not seeking instructions on how to navigate from one point to another, but merely wishes to be provided with information concerning, for example, traffic. In such circumstances, a "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Referring to FIG. 1, a navigation device 100 is located within a housing (not shown). The navigation device 100 comprises or is coupled to a GPS receiver device 102 via a connection 104, wherein the GPS receiver device 102 can be, for example, a GPS antenna/receiver. It should be understood that the antenna associated with receipt of information for location determination and the receiver designated by reference numeral 102 are combined schematically for illustration, but that the antenna and receiver may be separately located components, and that the antenna may be a GPS patch antenna or helical antenna for example.

The navigation device 100 includes a processing resource comprising, for example, a processor 106, the processor 106 being coupled to an input device 108 and a display device, for example a display screen 110. Although reference is made here to the input device 108 in the singular, the skilled person should appreciate that the input device 108 represents any number of input devices, including a keyboard device, voice input device, touch panel and/or any other known input device utilised to input information. Likewise, the display screen 110 can include any type of display screen for example a Liquid Crystal Display (LCD).

In one arrangement, one aspect of the input device 108, the touch panel, and the display screen 110 are integrated so as to provide an integrated input and display device, including a touchpad or touchscreen input to enable both input of information (via direct input, menu selection, etc.) and display of information through the touch panel screen so that a user need only touch a portion of the display screen 110 to select one of a plurality of display choices or to activate one of a plurality of virtual or "soft" buttons. In this respect, the processor 106 supports a Graphical User Interface (GUI) that operates in conjunction with the touchscreen.

In the navigation device 100, the processor 106 is operatively connected to and capable of receiving input information from the input device 108 via a connection 112, and operatively connected to at least one of the display screen 110 and an output device 114, for example an audible output device (e.g. a loudspeaker), via respective output connections 116, 118. As the output device 114 can produce audible information for a user of the navigation device 100, it should equally be understood that, as suggested above, the input device 108 can include a microphone and software for receiving input voice commands. Further, the navigation device 100 can also include any additional input device and/or any additional output device, for example audio input/output devices.

The processor 106 is operatively connected to a memory resource 120 comprising, for example a Random Access Memory (RAM) and a digital memory, such as a flash memory, via connection 122 and is further arranged to receive/send information from/to input/output (I/O) port 124 via connection 126, wherein the I/O port 124 is connectable to an I/O device 128 external to the navigation device 100.

The external I/O device 128 can include, but is not limited to, an external listening device, for example an earpiece. The connection to the I/O device 128 can further be a wired or wireless connection to any other external device, for example a car stereo unit for hands-free operation and/or for voice activated operation, for connection to an earpiece or headphones, and/or for connection to a mobile telephone; the mobile telephone connection can be used to establish a data connection between the navigation device 100 and the Internet or any other network for example, and/or to establish a connection to a server via the Internet or some other network for example.

The navigation device 100 is capable of establishing a data session, if required, with network hardware of a "mobile" or telecommunications network via a mobile communications device (not shown), for example the mobile telephone described above, a PDA and/or any device comprising mobile telephone technology. The navigation device 100 can establish a digital connection, for example a digital connection via known Bluetooth technology, with the mobile communications device. Thereafter, through its network service provider, the mobile communications device can establish a network connection (through the Internet for example) with the server (not shown). As such, a "mobile" network connection can be established between the navigation device 100 (which can be, and oftentimes is, mobile as it travels alone and/or in a vehicle) and the server to provide a "real-time" or at least very "up to date" gateway for information.

In this example, the navigation device 100 also comprises an input port 125 operatively coupled to the processor 106 via connection 127 for receipt of traffic-related data.

It will, of course, be understood by one of ordinary skill in the art that the electronic units schematically shown in FIG. 1 are powered by one or more power sources (not shown) in a conventional manner. As will also be understood by one of ordinary skill in the art, different configurations of the units shown in FIG. 1 are contemplated. For example, the components shown in FIG. 1 may be in communication with one another via wired and/or wireless connections and the like. Thus, the navigation device 100 described herein can be a portable or handheld navigation device 100.

It should also be noted that the block diagram of the navigation device 100 described above is not inclusive of all components of the navigation device 100, but is only representative of many example components.

Figure 2:
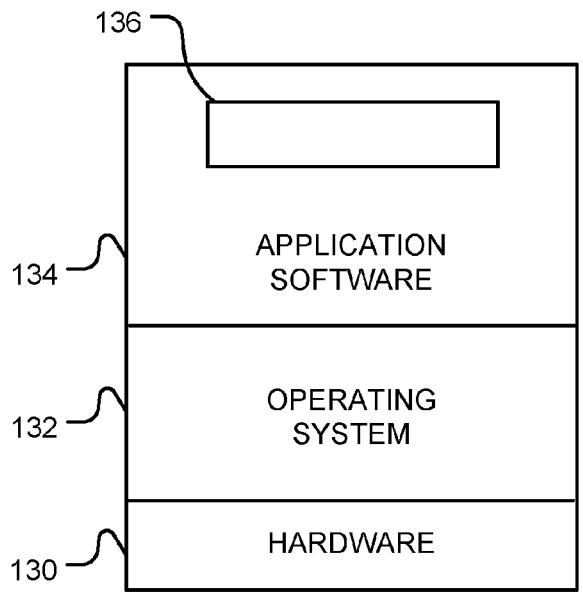
FIG. 2 is a schematic diagram of an architectural stack employed in the navigation device of FIG. 1.

Turning to FIG. 2, the memory resource 120 stores a boot loader program (not shown) that is executed by the processor 106 in order to load an operating system 132 from the memory resource 120 for execution by functional hardware components 130, which provides an environment in which application software 134 (implementing some or all of the above described route planning and navigation functionality) can run. The operating system 132 serves to control the functional hardware components 130 and resides between the application software 134 and the functional hardware components 130. The application software 134 provides an operational environment, including the GUI, which supports core functions of the navigation device 100, for example map viewing, route planning, navigation functions and any other functions associated therewith. In this example, part of the application software 134 comprises a traffic data processing module 136 that receives and processes the traffic-related data and provides the user with traffic information integrated with map information. As such functionality is not, by itself, core to the embodiments described herein, no further details of the traffic data processing module 136 will be described herein for the sake of conciseness and clarity of description.

Figure 3:
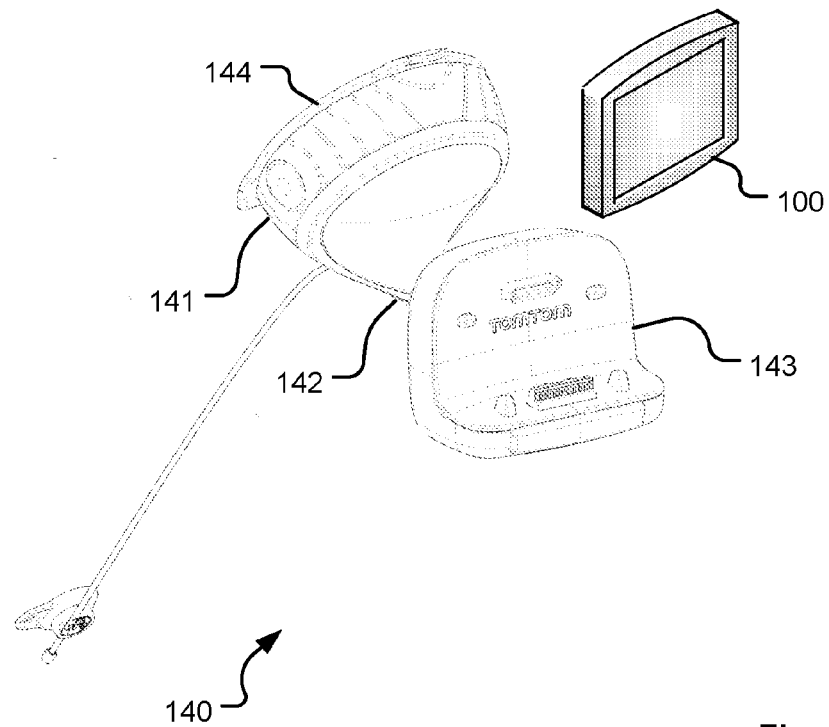
FIG. 3 is a schematic diagram of a mount and/or docking station in which part of an antenna apparatus is disposed and coupled to a navigation device of FIG. 1.

Referring to FIG. 3, the navigation device 100 is, in this example, capable of being disposed in a docking station 140, the docking station or mount 140 comprising a base portion 141 capable of being secured to, for example, a vehicle dashboard or window using a suction cup 144, and a holder portion 143 coupled to the base portion 141 by an arm 142. In this example, the base portion 141 and the arm 142 are integrally formed. The navigation device 100 can be docked with, or otherwise connected to, the holder portion 143 of the docking station 140 by snap connecting the navigation device 100 to the holder portion 143, for example. The navigation device 100 can also be rotatable about the arm 142 by virtue of a ball and socket connection between the arm 142 and the holder portion 143. To release a connection between the navigation device 100 and the docking station 140, a button on the navigation device 100 is provided and can be pressed. Other equally suitable arrangements for coupling and decoupling the navigation device 100 to a docking station can alternatively be provided.

Figure 4:
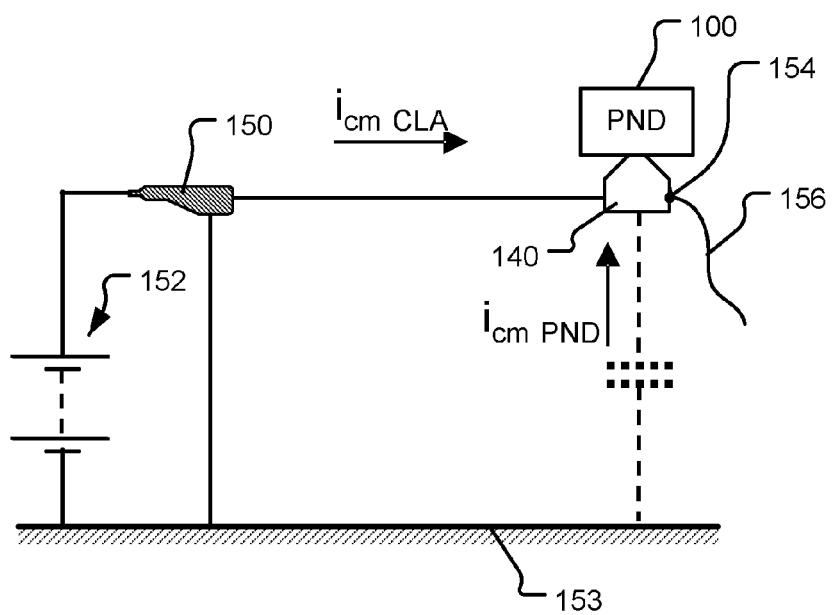
FIG. 4 is a schematic diagram of the docking station or mount of FIG. 3, when in use.

Turning to FIG. 4, the navigation device 100 is, in this example, located in a vehicle, for example an automobile, and connected to the docking station 140. The docking station 140 is coupled to a Cigarette Lighter Adaptor (CLA) 150, the CLA 150 being plugged into a so-called cigar or cigarette lighter (not shown) of the vehicle. The coupling of the CLA 150 to the cigarette lighter of the vehicle allows a battery 152 of the vehicle to be used to power the navigation device 100, in this example via the docking station 140, after appropriate conversion of the 12V Direct Current (DC) supply provided by the battery 152. Both the battery 152 and the CLA 150 are coupled to a ground 153 provided by the vehicle, typically the chassis or body of the vehicle.

In one embodiment, the docking station 140 comprises a pole extension port 154 that is coupled to a pole extension portion 156, which is part of an antenna apparatus (not shown in FIG. 4). In this respect, the pole extension portion 156 can comprise a coupling connector (not shown), for example a jack plug, for coupling to the input port 154, the connector being coupled to a tuner (not shown in FIG. 4) located in a housing of the docking station 140. In the following example, however, the pole extension portion 156 is coupled to a part of the antenna apparatus in a manner that is not detachable by the user. The skilled person should also appreciate that the pole extension portion 156 can be stowed, for example by winding the pole extension portion 156 around a tidy protrusion or arrangement, and can be used in the stowed state.

Figure 5:
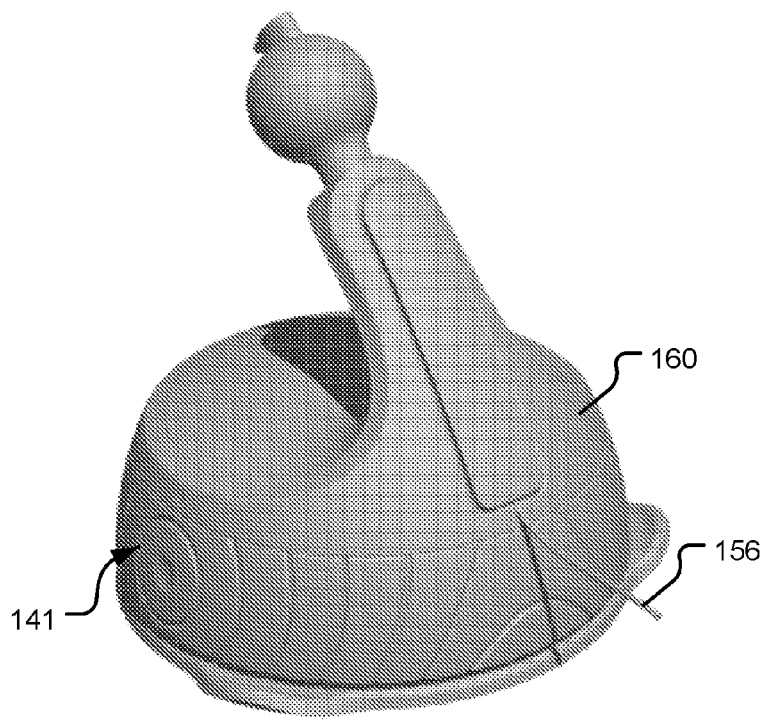
FIG. 5 is a schematic diagram of the exterior of part of the docking station or mount of FIG. 3 in greater detail.

Referring to FIG. 5, the docking station 140 comprises a housing 160 within which an RDS-TMC reception apparatus is disposed. The RDS reception apparatus comprises a tuner (not shown in FIG. 5) and part of an antenna arrangement apparatus (also not shown in FIG. 5). The antenna arrangement apparatus comprises the antenna apparatus, which includes the pole extension portion 156. Hence, the docking station or mount 140 comprises at least part of the antenna arrangement apparatus. In this example, the docking station or mount 140 comprises all of the antenna arrangement apparatus apart from a substantial part of the pole extension portion 156.

Figure 6:
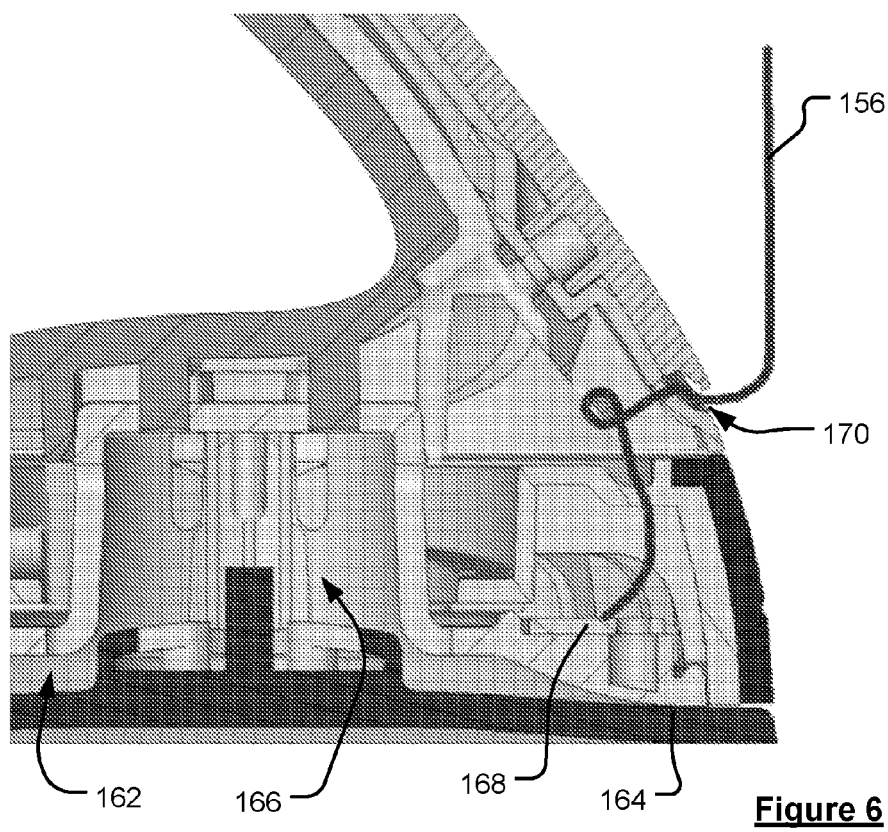
FIG. 6 is a cross-sectional view of part of the docking station or mount of FIG. 5.

Turning to FIG. 6, the housing 160 of the docking station 140 defines an open cavity 162 that is spaced from the holder portion 143 and is closed by a suction cup 164 that is coaxially coupled to an internal fixing 166 of the housing 160. A printed circuit board 168 is disposed within the housing 160 adjacent the suction cup 164. The printed circuit board 168 is, in this example, disc-shaped and carries a part of the antenna apparatus that includes a first pole portion (not shown in FIG. 6) and a second pole portion (also not shown in FIG. 6). In this example, the pole extension portion 156 is coupled to the second pole portion by soldering to the printed circuit board 168. The pole extension portion 156 extends out of the housing 160 via an aperture 170. As can be seen, the pole extension portion 156 resides substantially externally to the housing 160.

Figure 7:
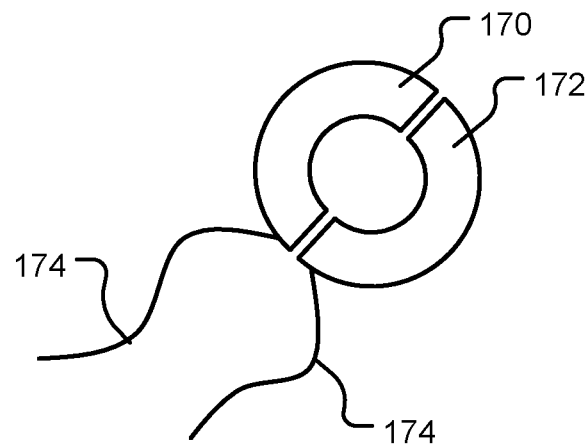
FIG. 7 is a schematic diagram of a dipole antenna employed by the antenna apparatus of FIG. 3 and constituting part of an embodiment of the invention.

Referring to FIG. 7, the first pole portion 170 and the second pole portion 172 are disposed upon a carrier, for example the printed circuit board 168. Hence, the first and second pole portions 170, 172 can be planar or laminar. In this example, the first pole portion 172 extends to form a first loop and the second pole portion 172 extends to form a second loop. Although the carrier has been described herein as being disc-shaped, the skilled person should appreciate that the first pole portion 170 can reside on a first carrier part, for example a first crescent-shaped carrier, and the second pole portion 172 can reside on a second, separate carrier, part, for example a second crescent-shaped carrier. The first and second crescent-shaped carrier parts can, if desired, be arranged to form a substantially disc-like shape. However, the first and second carrier parts need not be crescent-shaped for all applications.

Figure 8:
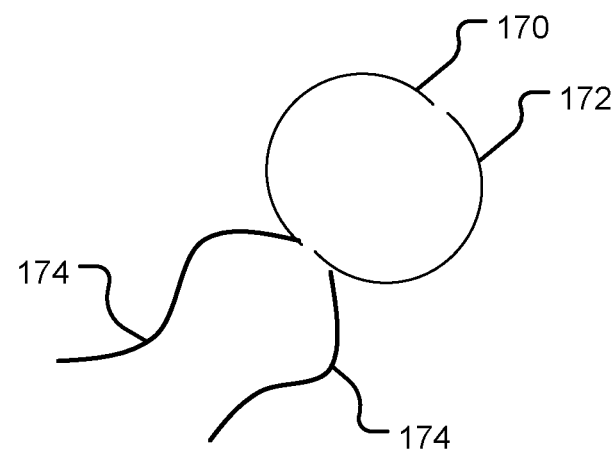
FIG. 8 is a schematic diagram of another dipole antenna employed by the antenna apparatus of FIG. 3 and constituting part of another embodiment of the invention.

Referring to FIG. 8, in an alternative example, the first pole portion 170 can be formed as a first single line or track and the second pole portion 172 can be formed as a second single line or track. If desired, the line or track can be formed so as to assume a meander antenna pattern.

Irrespective of whether the first and second pole portions 170, 172 are formed as loops, lines or tracks, the thicknesses of one or both antenna elements forming the first and second pole portions 170, 172 can be between about 35 μm thick and about 1.5 mm thick, for example between about 0.5 mm thick and about 1.5 mm thick. These dimensions include lines used to form the loops.

In the examples described above, the first and second pole portions 170, 172 constituting a dipole antenna have coupling wires 174 connected thereto.

The provision of the first and second pole portions 170, 172 as a loop, line or track results in use of the antenna apparatus not impeding operation of the GPS antenna of the navigation device 100. In this respect, the interference coupling from the pole portions (170, 172) of the dipole antenna to the GPS antenna is reduced so as to ensure that the navigation device 100 is capable of receipt of ephemeris data. Of course, the skilled person should appreciate that the GPS antenna is merely an example of a satellite broadcast receive antenna and compatibility between the antenna apparatus and other types of receive antennas is contemplated, for example those capable of receiving other types of global navigation satellite system signals.

Figure 9:
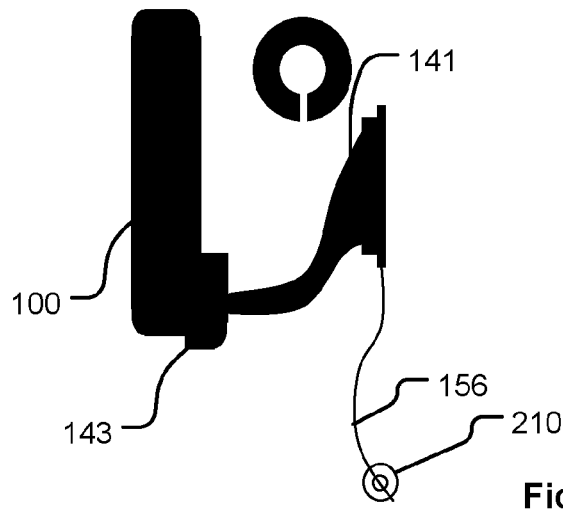
FIG. 9 is a schematic diagram including a pole extension portion for the antennas of FIG. 7 or 8.
Figure 10:
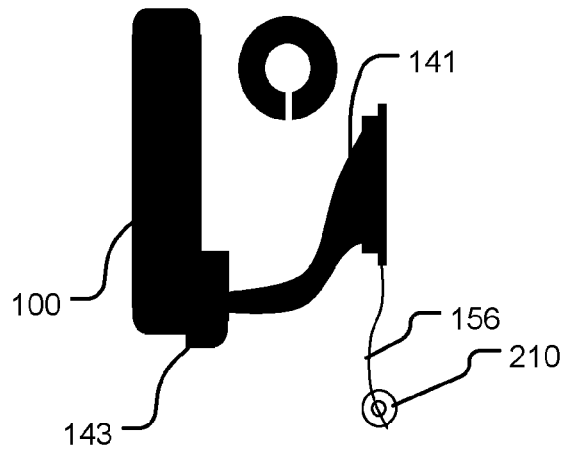
FIG. 10 is a schematic diagram of an alternative embodiment to that of FIG. 9.

In this example, the pole extension portion 156 is a flexible wire, for example a uniaxial or unicore wire. The pole extension portion 156 can vary in length depending upon the sensitivity required of the antenna apparatus. Turning to FIG. 9, the pole extension portion 156 is about 20 cm in length and contributes to an antenna sensitivity, expressed in terms of RF output level (U), of about 250 μV. This translates to a field strength near the antenna apparatus of about 50 $\mu Vm^{-1}$. Referring to FIG. 10, in another embodiment, the pole extension portion 156 can be shorter and is about 10 cm in length and contributes to a reduced antenna sensitivity (U) of about 350 μV. This translates to a field strength near the antenna apparatus of about 70 $\mu Vm^{-1}$. In a further embodiment (FIG. 11), the pole extension portion 156 is again about 20 cm but is removable from the second pole portion 172. In this embodiment, the pole extension portion 156 is removably pluggable with respect to the second pole portion 172 via the input port 154. When connected to the second pole portion 172, the pole extension portion 156 again contributes to the antenna sensitivity (U) being about 250 μV (or a field strength near the antenna apparatus of about 50 $\mu Vm^{-1}$). When the pole extension portion 156 is disconnected from the second pole portion 172, the sensitivity (U) of the antenna apparatus is about 750 μV (or a field strength near the antenna apparatus of about 150 $\mu Vm^{-1}$).

Since the first and second pole portions 170, 172 are small in length relative to known antenna structures used for RDS-TMC data reception, a Low Noise Amplifier (LNA) can be provided in-line between the tuner and the antenna apparatus, examples of which will be described in further detail later herein.

Figure 11:
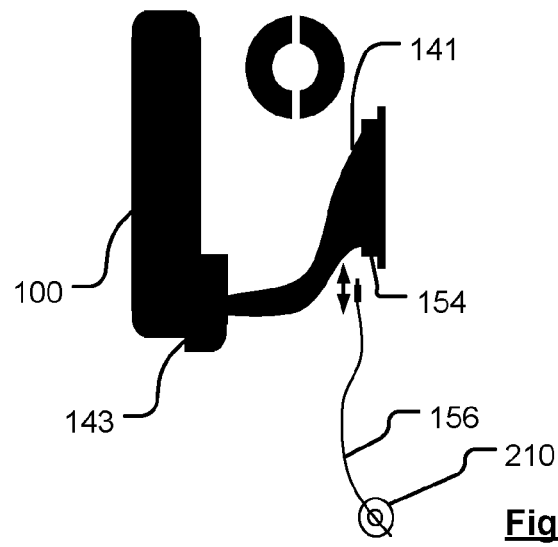
FIG. 11 is a schematic diagram of another alternative embodiment to that of FIG. 9.

As can be seen from the embodiments of FIGS. 9, 10 and 11, the holder portion 143 is located opposite the base portion 141. Additionally, the holder portion 143 is spaced from the base portion 141 and, in particular, the RDS antenna apparatus 188 by a distance of, for example, more than 5 cm. Consequently, when the navigation device 100 is disposed in the holder portion 143, the navigation device 100 and hence the GPS antenna of the navigation device 100 is located substantially opposite the RDS antenna apparatus 188 and is spaced apart from the RDS antenna apparatus 188. Consequently, by virtue of the relative location with respect to the GPS antenna, interference coupling from the antenna apparatus 188 into GPS antenna is further minimised.

Figure 12:
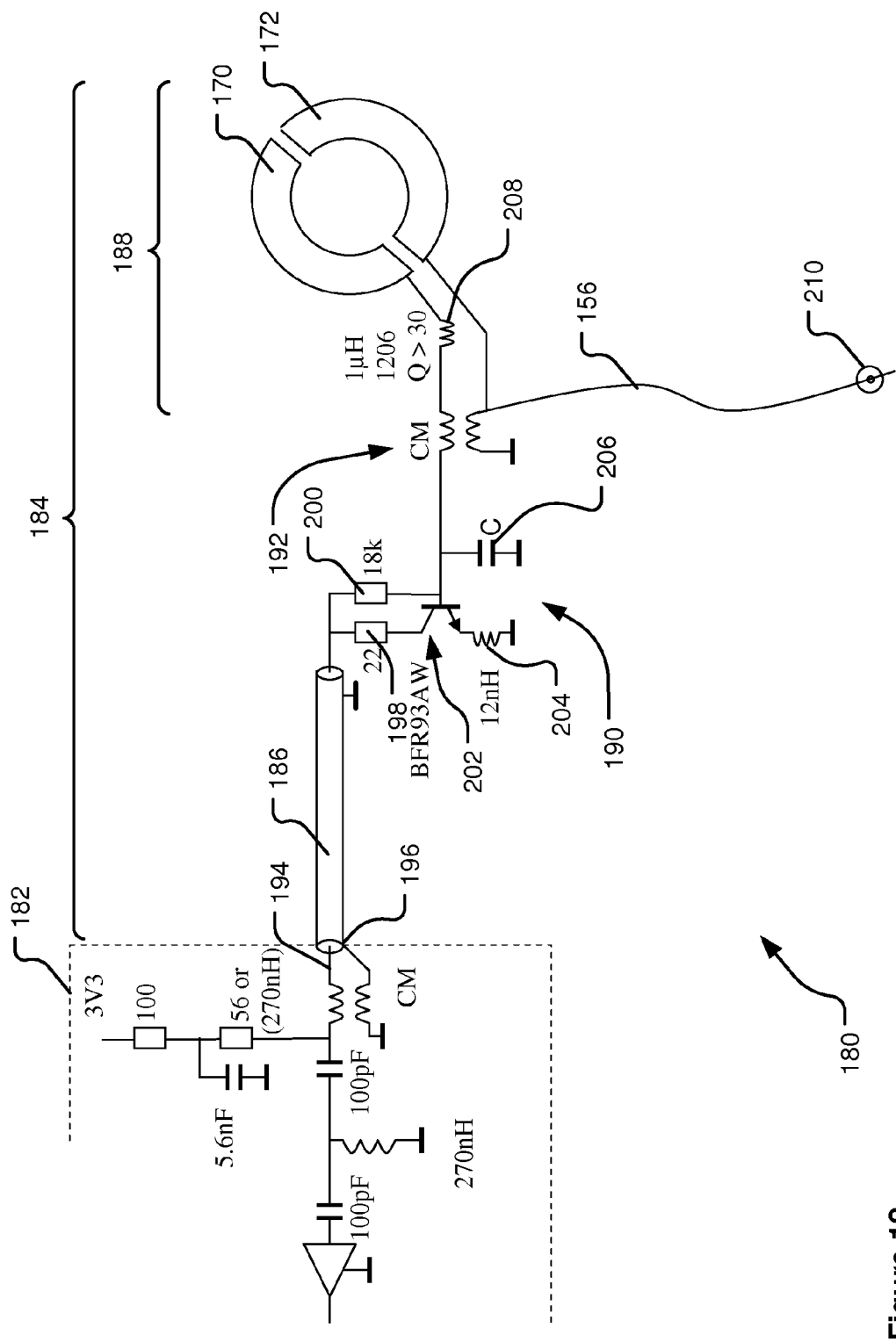
FIG. 12 is a schematic diagram of an antenna arrangement apparatus employing the antenna apparatus of FIG. 9.

Turning to FIG. 12, the RDS-TMC reception apparatus 180 comprises the TMC tuner 182 coupled to the antenna arrangement apparatus 184. The tuner 182 is, in this example, a Frequency Modulation (FM) receiver, particularly an RDS-TMC tuner. By way of example, a suitable receiver is available from GNS GmbH, Germany. The antenna arrangement apparatus 184 comprises a feedline 186 coupled to an antenna apparatus 188. In this example, the feedline 186 is coupled to the antenna apparatus 188 via an amplifier device 190 and a filter 192.

The feedline 186 is, in this example, a length of coaxial cable having a core 194 and a shield 196 coupled at first ends thereof, to the tuner 182. The core 194 of the length of coaxial cable 186 is coupled, at a second end thereof, to first terminals of a first resistor 198 and a second resistor 200 of a low noise amplifier circuit constituting the amplifier device 190. The shield 196 is coupled to ground potential at the second end of the feedline 196. A second terminal of the first resistor 198 is coupled to a collector terminal of a bipolar transistor 202 of the low noise amplifier circuit. A second terminal of the second resistor 200 is coupled to a base terminal of the bipolar transistor 202. An emitter terminal of the bipolar transistor 202 is coupled to ground potential via an inductor 204 of the low noise amplifier circuit.

The base terminal of the bipolar transistor 202 is optionally coupled to the ground potential via a capacitor 206 to improve resonance as will be described shortly hereinafter. The base terminal of the bipolar transistor 202 is further coupled to a first terminal of the common-mode filter 192, a second terminal of the common-mode filter 192 being coupled to the ground potential. As mentioned above, the first and second pole portions 170, 172 are small relative to the size of known pole portions used for receipt of RDS-TMS data. Consequently, the antenna apparatus is capacitive and so a third terminal of the common-mode filter 192 is coupled to the first pole portion 170 via another inductor 208 in order to make the antenna apparatus resonant in respect of the frequency band of interest, for example the frequency band associated with receipt of RDS-TMC data. The inductance value of the another inductor 208 is dependent upon the length of the pole extension portion 156. A fourth terminal of the common-mode filter 192 is coupled to the second pole portion 172 and the pole extension portion 156.

In any of the above embodiments, at a distal end (with respect to the first and second pole portions 170, 172) of the length of coaxial cable 186 (feedline) 186, the core 194 of the length of coaxial cable 186 and the shield 196 of the length of the coaxial cable 186 are coupled to a first terminal and a second terminal of another filter of the tuner 182, respectively. However, the another filter need not be employed. Referring back to the common-mode filter 192, the filter 192 is, for example a common-mode transformer, such as a coil, or a toroidal inductor or a common-mode choke, for example a bifilar choke. The filter 192 is located in the housing 160 and has a common-mode impedance and a differential-mode impedance. The common-mode impedance of the filter 192 can be at least about 1 kΩ. The common-mode impedance can be between about 1 kΩ and about 4 kΩ, for example between about 1.5 kΩ and about 2.5 kΩ, such as between about 2 kΩ and about 2.3 kΩ. In this example, the filter 192 has a common-mode impedance of about 2.2 kΩ. This is considerably in excess of an inherent common-mode impedance of a length of cable. The differential-mode impedance of the filter 192 can be between about 1Ω and about 50Ω, for example, between about 1Ω and about 20Ω, such as between about 5Ω and about 15Ω. In this example, the differential-mode impedance of the filter 192 is about 10Ω.

In any of the above embodiments, the amplifier device 190 can be provided in-line between a proximal end (with respect to the first and second pole portions 170, 172) of the length of coaxial cable 186 and the first and second pole portions 170, 172. The antenna arrangement apparatus 184 is therefore "active". In one embodiment that differs from that described above, the amplifier 190 can be coupled between the common-mode filter 192 and the first and second pole portions 170, 172. In this respect, the third terminal of the common-mode filter 192 is coupled to an output of the RF amplifier circuit 190 and an input of the amplifier device 190 is coupled to the first pole portion 170. A ground terminal of the amplifier device 190 is coupled to the fourth terminal of the common-mode filter 192 and the second pole portion 172.

Of course, it should be appreciated that, in the examples set forth above, the RF amplifier circuit can be any suitable RF amplifier, for example the Low Noise Amplifier (LNA) described above, and can include an RF transistor serving as the transistor 202, available from Infineon Technologies AG (for example, part number: BFR 93) or NXP Semiconductors. Where the RF amplifier 192 is employed, the first pole portion and/or the second pole portion can be of the shortened lengths illustrated in FIGS. 7, 8 and 12, for example, less than about 50 cm each, for example less than 20 cm, such as between about 15 cm and about 20 cm as used in the examples described herein. The first and second pole portions 170, 172 are therefore capacitive. Consequently, in order to compensate for capacitive effects resulting from use of shorter pole portions, the second inductor 208, constituting a compensatory inductance, for example a coil, such as a coil of 1 μH inductance, can be provided, in-line, between the third terminal of the filter 192 and the first pole portion 170 or the fourth terminal of the filter 192 and the second pole portion 172. The inductance value of the compensatory inductance 208 can be between about 250 nH and about 1.25 μH depending upon the respective lengths of the pole portions 170, 172 and associated structures.

In any of the above examples, the pole extension portion 156 can have a "sucker" or small suction cup 210 or other suitable coupling device attached thereto in order to facilitate extension and arrangement of the pole extension portion 156 and/or coupling to a windshield. Typically, the sucker 210 is disposed towards the end of the length of the pole extension portion 156.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments have been described in relation to reception of FM signals, particularly RDS-TMC signals, the skilled person should appreciate that the above embodiments can be used in respect of other applications, for example Digital Audio Broadcast (DAB) reception, such as Transport Protocol Experts Group (TPEG) data streams. Indeed, the skilled person should appreciate that the antenna arrangement apparatus can be used to receive signals bearing audio information, for example FM audio signals. Consequently, the antenna arrangement apparatus can be used in connection with FM radio applications, for example FM radio applications used in relation to other electronic devices, such as communications devices. One suitable example is a mobile telephone handset comprising an integrated FM receiver or coupled to an FM receiver module.

By way of another example, the pole extension portion 156 can be coupled to a distal end (with respect to the feedline 186) of the second pole portion 172 instead of the proximal end of the second pole portion 172.

As a further example, although embodiments described herein refer to use of the pole extension portion 156 in conjunction, or at least removably in conjunction, with the dipole antenna, the skilled person should appreciate that use of the pole extension portion 156 is not mandatory and embodiments comprising the RDS antenna apparatus simply having a pole portion formed from a loop, line or track without the use of the pole extension portion 156 is contemplated.

Furthermore, it should be appreciated that features described herein may be combined in any appropriate manner and the embodiments described herein should not be understood as self-contained and features of one embodiment may be combined with one or more features of one or more other embodiments described herein.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A docking station apparatus comprising:
   a holder portion for removably receiving a navigation apparatus; and
   a base portion coupled to the holder portion and comprising an RDS dipole antenna apparatus, the RDS dipole antenna apparatus being spaced from the holder portion and comprising first and second pole portions, each of the first and second pole portions extending so as to form a loop, line or track;
   wherein at least one of the first pole portion and the second pole portion is arc-shaped or crescent-shaped.

2. An apparatus as claimed in claim 1, wherein the RDS dipole antenna apparatus is disposed on a carrier.

3. An apparatus as claimed in claim 2, wherein the carrier or carriers are one or more circuit boards.

4. An apparatus as claimed in claim 1, wherein the RDS dipole antenna apparatus further comprises a filter.

5. An apparatus as claimed in claim 4, wherein the filter comprises a common mode filter.

6. An apparatus as claimed in claim 5, wherein the common mode filter has a common mode impedance approximately in the range 1 k ohms to 4 k ohms.

7. An apparatus as claimed in claim 5, wherein the filter has a differential mode impedance approximately in the range 1 ohm to 50 ohms.

8. An apparatus as claimed in claim 1, wherein the first and second pole portions are disposed on separate carriers.

9. An apparatus as claimed in claim 1, wherein the first pole portion is disposed adjacent the second pole portion so as to define a disc shape.

10. An apparatus as claimed in claim 1, wherein an antenna element forming the loop, line or track is between about 35 µm thick and about 1.5 mm thick.

11. An apparatus as claimed in claim 1, wherein the base portion comprises a cavity for housing the RDS dipole antenna, the cavity of the base portion being spaced from the holder portion.

12. An apparatus as claimed in claim 1, wherein the antenna associated with receipt of information for location determination is a global navigation satellite system signal reception antenna.

13. An apparatus as claimed in claim 1, wherein the pole portions are capacitive.

* * * * *